US006847491B1

(12) United States Patent
Jian et al.

(10) Patent No.: US 6,847,491 B1
(45) Date of Patent: Jan. 25, 2005

(54) HYBRID MICROLENS ARRAY

(75) Inventors: Benjamin Bin Jian, Fremont, CA (US); Michael H. Leary, Union City, CA (US)

(73) Assignee: Arrayed Fiberoptics Corporation, Santa Clara, CA (US)

( * ) Notice: Subject to any disclaimer, the term of this patent is extended or adjusted under 35 U.S.C. 154(b) by 276 days.

(21) Appl. No.: 09/672,159

(22) Filed: Sep. 27, 2000

Related U.S. Application Data

(60) Provisional application No. 60/155,915, filed on Sep. 27, 1999.

(51) Int. Cl.[7] .................... G02B 11/00; G02B 27/10; G02B 6/32; G02B 6/36
(52) U.S. Cl. .................... 359/642; 359/619; 359/620; 385/33; 385/34; 385/93
(58) Field of Search .................... 359/642, 809, 359/811, 819, 619, 620; 257/232, 233, 432, 435, 437; 385/33, 34, 93

(56) References Cited

U.S. PATENT DOCUMENTS

| | | | | |
|---|---|---|---|---|
| 5,195,150 A | * | 3/1993 | Stegmueller et al. | 385/33 |
| 5,200,010 A | * | 4/1993 | Funami et al. | 156/154 |
| 5,449,630 A | * | 9/1995 | Lur et al. | 438/386 |
| 5,790,730 A | * | 8/1998 | Kravitz et al. | 385/49 |
| 5,846,638 A | * | 12/1998 | Meissner | 428/220 |
| 6,483,961 B1 | * | 11/2002 | Helkey et al. | 385/18 |

OTHER PUBLICATIONS

K. Iga and S. Misawa, "Distributed—Index Planar Microlens and Stacked Planar Optics: A Review of Progress", in Applied Optics, vol. 25, No. 19, pp. 3388–3396(1986).
K. Reimer, H.J. Quenzer, M. Jurss, B. Wagner, "Micro–Optic Fabrication Using One–Level Gray–Tone Lithography", in SPIE vol. 3008, pp. 279–288, 1997.

* cited by examiner

*Primary Examiner*—Hung Xuan Dang
*Assistant Examiner*—Joseph Martinez
(74) *Attorney, Agent, or Firm*—JOI Patent; Joshua D. Isenberg

(57) ABSTRACT

The disclosed hybrid microlens enables the economical production of large diameter, high numerical aperture refractive microlens by microfabrication. The hybrid microlens has a combination of a refractive microlens formed on a thin layer of high index material such as silicon and a spacer layer of a low index material such as fused silica. Advantages include substantially reduced lens sag, fast etching of the microlens, small wafer stack thickness, large diffraction angle in the low index spacer, large optical beam diameter, high optical performance, and low cost.

Also disclosed is a design for substantially reduced optical return signal and small polarization dependent optical loss from an optical fiber which is perpendicular to and butt-coupled to a planar optical surface. This design is to form a small slanted surface on the planar optical surface in the vicinity of the optical fiber core and fill the space between the fiber and the slanted surface with an index-matching optical epoxy.

24 Claims, 4 Drawing Sheets

HYBRID MICROLENS ARRAY

CROSS REFERENCE TO RELATED APPLICATIONS

This application is related to U.S. patent application Ser. No. 09/327,826, entitled "Multilayer Optical Fiber Coupler", filed Jun. 8, 1999 by Benjamin B. Jian now U.S. Pat. No. 6,328,482, issued Dec. 11, 2001.

Priority is hereby claimed to U.S. Provisional Patent Application No. 60/155,915, filed Sep. 27, 1999, entitled Hybrid Microlens Array.

TECHNICAL FIELD

The present invention generally relates to microlens arrays and, more particularly, to microlens arrays made by photolithographic processes.

BACKGROUND OF THE INVENTION

Wafer stacking is recognized as a promising technology for making compact, low cost optoelectronic and fiberoptic devices. Microlenses made using photolithography are fundamental components of this technology. For a concise introduction of the technology, See, for example, a review article by K. Iga and S. Misawa entitled "distributed-index planar microlens and stacked planar optics: a review of progress", published in APPLIED OPTICS, Vol. 25, No. 19, pp. 3388–3396 (1986). When designing devices using this technology, there is a need for two fibers to share the same microlens, as in dual fiber collimator applications for beam splitters and integrated fiber filters (FIG. 20 in aforementioned article).

FIG. 1 shows a dual fiber collimator according to copending U.S. patent application Ser. No. 09/327,826, in which a fused silica refractive microlens wafer 140 is precisely aligned and bonded to a silicon wafer 130 which has two photolithographically defined and etched through holes called fiber sockets 120 which are used to precisely align the optical fibers 100 to the microlens 150. The optical fibers 100 are inserted into the bottom of the fiber sockets 120. Index-matching epoxy 110 is used to fill any gap between the fused silica wafer 140 and the fiber 100. The microlens 150 is designed so that its focal plane is at the back surface of the microlens wafer 140. Optical signals 170 (ray traces) emitting from the fiber cores 160 are collimated by the microlens 150. The microlens diameter should be large enough to enclose the light emission from both fibers within the low aberration portion of the lens near its center. For the case of two 125 micron diameter fibers adjacent to each other with a microlens wafer 140 thickness of 800 microns, the microlens 150 diameter should be about 335 microns or more.

A basic requirement of the wafer stacking technology is that the final thickness of the wafer stack be as small as possible, since the wafer stack is to be diced into small chips. A thick wafer stack makes dicing into very small pieces without adversely affecting device performance or mechanical integrity difficult. Since the wafer stack thickness will determine the minimum chip size, a thinner microlens wafer 140 in the wafer stack will result in a potentially higher number of chips per wafer, and correspondingly lower cost per chip. A typical microlens wafer thickness may be 800 microns.

The thickness of the microlens wafer 140 also determines the optical beam diameter. The beam diameter is linearly proportional to thickness of the microlens wafer 140 and inversely proportional to the refractive index of the microlens wafer 140. A large diameter of the collimated light beam is critical in wafer stacking technology, since the diameter of the collimated beam determines the collimated distance of the beam, according to light diffraction. A large beam diameters allows long working distances and low diffraction loss. To obtain a large beam diameter, a material with low refractive index such as fused silica or glass is preferred since the light beam emerging from the optical fiber 100 expands in the shortest distance in low index material.

The large microlens diameter and the small thickness of the microlens wafer dictates a high numerical aperture microlens made using glass or fused silica as the substrate for the microlens wafer 140.

There are currently three kinds of microlenses made using photolithographic techniques: refractive, diffractive, and planar diffused microlenses.

Refractive microlenses are made by forming convex surface profiles which provides the light transforming function. The convex profile may be formed by dry etching with either a reflow photoresist mask or a gray scale photoresist mask, which is described in an article entitled "micro-optic fabrication using one-level gray-tone lithography", by K. Reimer et. al., in SPIE Vol. 3008, pp. 279–288, 1997. The gray scale mask technique is a general photolithographic technique for fabricating arbitrarily shaped surfaces on a wafer. Photoresist is exposed with a spatially varying intensity which controls the photoresist thickness after development. For example, a slanted surface, which is used later in this invention, may be made using a monotonically increasing spatial intensity profile. Refractive microlenses have high performance and low spherical aberration, especially near the center of the microlens. The uniformity of refractive microlenses on a wafer is also excellent.

Planar diffused microlenses are made by diffusing ions into a suitable glass material using an annular metal mask to pattern the diffusion. The ion-exchanged glass has higher refractive index. Planar diffused microlenses can be made easily into large microlenses. However, the optical performance of the planar diffused microlens remains inferior to some other forms of microlens even after twenty years of development. The focal lengths of planar diffused microlenses are difficult to control and not sufficiently uniform across a wafer for fiber optic applications.

Diffractive microlenses are made using binary photomasks. A key advantage of the diffractive microlens is its large diameter. However, diffractive microlenses have higher optical losses than refractive microlenses.

The refractive microlens has the best optical performance among the three microlens types. However, it has been very difficult to make refractive microlens arrays with high numerical aperture and large diameter in fused silica due to the large microlens sag and the slow etch rate.

For the refractive microlens 150, the sag, or depth, s is related to the microlens diameter D through:

$$s = R - \sqrt{R^2 - \frac{D^2}{4}}$$

where:

$$R = \frac{(n-1)L}{n}$$

is the microlens radius of curvature, n is the index of refraction of the microlens material, L is the thickness of the microlens wafer, D is the microlens diameter.

At a wavelength of 1.5 micron, fused silica has an index of refraction of 1.46. A fused silica microlens of 335 micron diameter focusing to the back surface of an 800 micron thick fused silica wafer has a calculated sag of 63.7 microns. Given a typical fused silica etch rate of 300 angstrom per minute, 35 hours of etching would be required to etch this microlens.

Accordingly, there is a continuing need in the industry for a faster, more efficient and robust method for making large, high numerical aperture refractive microlenses.

SUMMARY OF THE INVENTION

In accordance with the invention, the hybrid microlens has a combination of a refractive microlens formed on a thin layer of high index material such as silicon and a spacer layer of a low index material such as fused silica. Advantages include reduced lens sag, fast etching of the microlens, small wafer stack thickness, large diffraction angle in the low index spacer, large optical beam diameter, high optical performance and low cost.

Also disclosed is a design for substantially reduced optical return signal and small polarization dependent optical loss from an optical fiber which is perpendicular to and butt-coupled to a planar optical surface. This design is to form a small slanted surface on the planar optical surface in the vicinity of the optical fiber core and fill the space between the fiber and the slanted surface with an index-matching optical epoxy.

These and other objects, features and benefits of the invention will be better understood from a consideration of the following detailed description taken in conjunction with the accompanying drawing.

BRIEF DESCRIPTION OF THE DRAWINGS

FIGS. 4A to 4J illustrate the steps of a preferred embodiment for making the hybrid microlens wherein:

FIG. 4A is a cross section of a first layer silicon wafer that has a layer of photoresist deposited thereon;

FIG. 4B is a cross section of the silicon wafer of FIG. 4A after trenches have been patterned on the photoresist using photolithography;

FIG. 4C is a cross section of the silicon wafer after the trenches have been etched using photoresist as the etch mask;

FIG. 4D is a cross section of the silicon wafer after the photoresist has been stripped and an anti-reflection coating layer has been formed;

FIG. 4E is a cross section of a second layer fused silica wafer that has a layer of photoresist deposited thereon;

FIG. 4F is a cross section of the fused silica wafer after the slanted surface has been formed in the photoresist layer using a gray scale photolithography process;

FIG. 4G is a cross section of the fused silica wafer after the wafer has been etched using the slanted surface photoresist as the erodable mask;

FIG. 4H is a cross section of the silicon wafer and fused silica wafer after wafer bonding;

FIG. 4I is a cross section of the bonded wafer stack after thinning and polishing of the silicon wafer; and FIG. 4J is a cross section of bonded wafer stack after a refractive microlens has been formed on the silicon upper surface.

DETAILED DESCRIPTION

For a more complete understanding of this invention, reference is now made to the following detailed description of the embodiments as illustrated in the accompanying drawing, wherein like numbers represent the same or similar elements.

Figure 1:
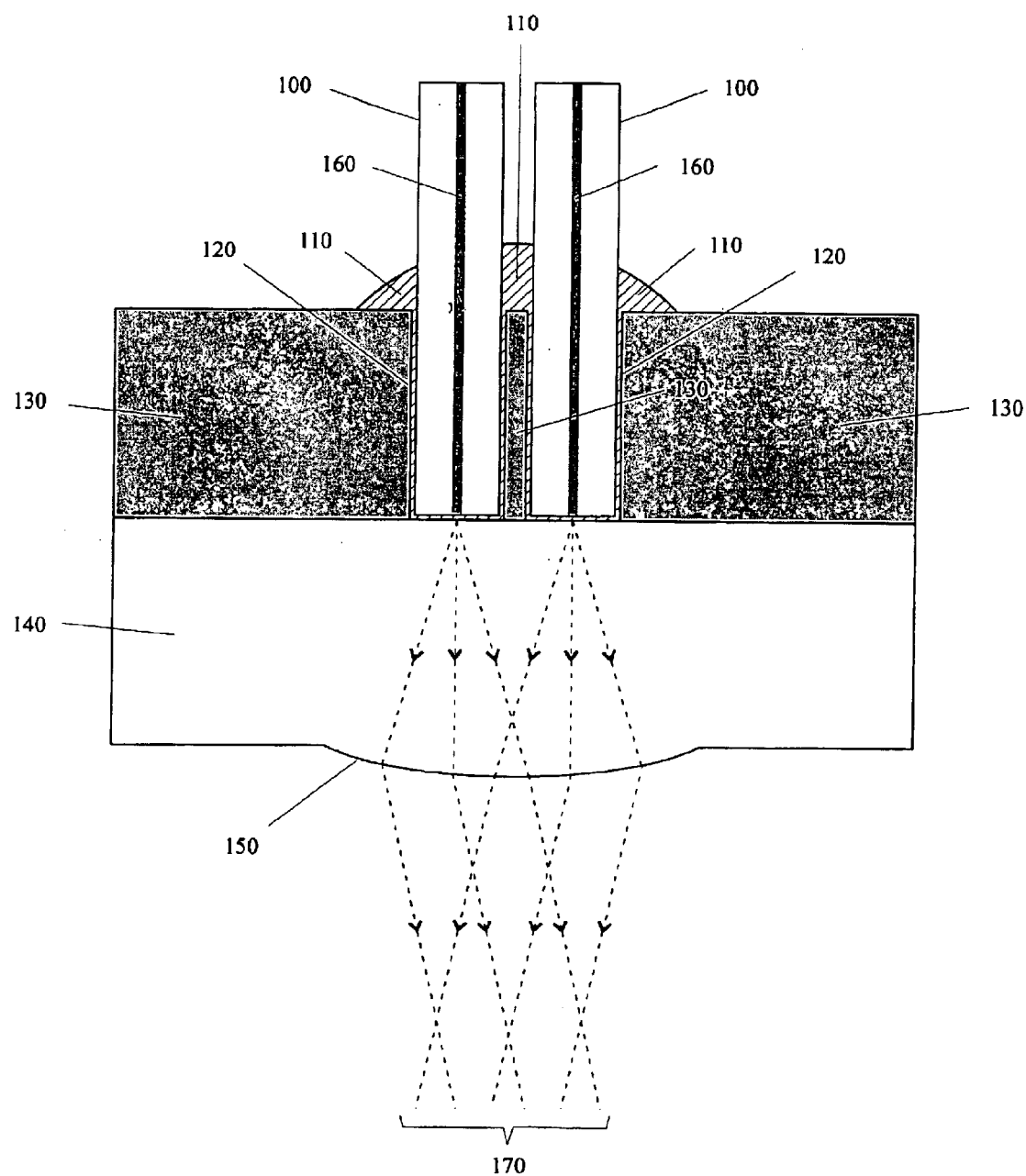
FIG. 1 is a cross-sectional view of a multilayer optical dual-fiber coupler, as disclosed in U.S. patent application Ser. No. 09/327,826, referenced above.
Figure 2:
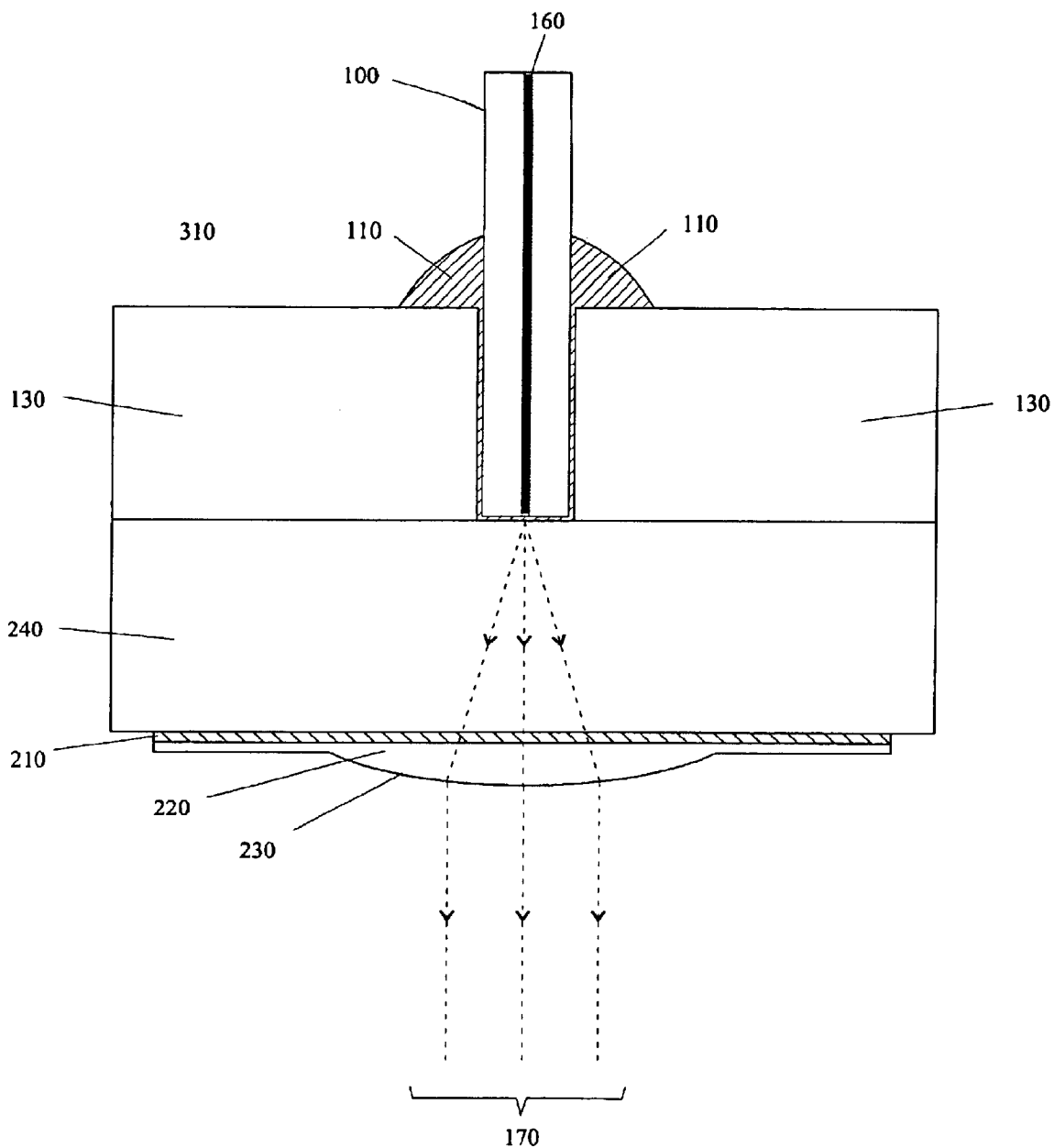
FIG. 2 is a cross sectional view of the hybrid microlens fiber coupler.

In FIG. 2, a preferred embodiment of the hybrid microlens is disclosed which enables large refractive microlenses to be made. The fused silica wafer 240 is bonded to a thin layer of high refractive index material 220 such as silicon which has a refractive microlens 230 made on the surface. Between the fused silica wafer 240 and the silicon 220, there is a layer of anti-reflection coating 210 to reduce the reflected light. The fused silica wafer 240 acts as a spacer layer for efficient light beam broadening and precise control of the distance between the fiber end face and the refractive microlens.

Using elementary geometrical optics, the hybrid microlens sag s is found to be:

$$s = R - \sqrt{R^2 - \frac{D^2}{4}}$$

where:

$$R = \frac{(n_1 - 1)L}{n_2} + \frac{(n_1 - 1)d}{n_1}$$

is the radius of curvature of the hybrid microlens, $n_1$ is the index of refraction of the high refractive index microlens material 220, $n_2$ is the index of refraction of the spacer layer 240, L is the thickness of the fused silica spacer wafer 240, d is the thickness of the high refractive index microlens layer 220, D is the diameter of the hybrid microlens.

The formula for radius of curvature R shown above means that R is approximately proportional to the refractive index difference at the microlens-air interface. For fused silica-air interface this difference is 0.46 while for silicon-air interface, this difference is 2.5, i.e., more than 5 times that of fused silica-air interface. This results in very significant reduction in microlens sag requirement and is the basis for this invention.

For example, at a working wavelength of 1.5 microns, $n_1=3.5$, and $n_2=1.46$. For the same microlens discussed previously with L=800 microns, D=335 microns, and d=30 microns, the hybrid microlens sag is only 10.1 micron, which is 16% of the value for the homogeneous fused silica lens. Given a typical silicon etch rate of 1000 angstrom per minute, only 1.7 hours of etching are required to form the hybrid microlens, which is 20 times more efficient than the homogeneous microlens. Therefore this hybrid microlens design allows large refractive microlenses to be made, which were previously impossible or impractical. The use of silicon for the high refractive index material applies only to light of wavelength longer than 1.1 microns, for which silicon is transparent.

The advantages of the present invention include small wafer stack thickness, large optical beam diameter, high optical performance due to the use of refractive microlenses, fast etching of the microlens surface and therefore lower cost.

The index-matching epoxy 110 reduces the reflections from the flat fused silica surface and flat end face of fiber 100. Experiment has shown that about −30 dB return loss may be achieved using this arrangement. However, in demanding telecommunication applications, the return loss is often required to exceed −55 dB. This return loss specification will not be satisfied with flat surfaces.

Figure 3:
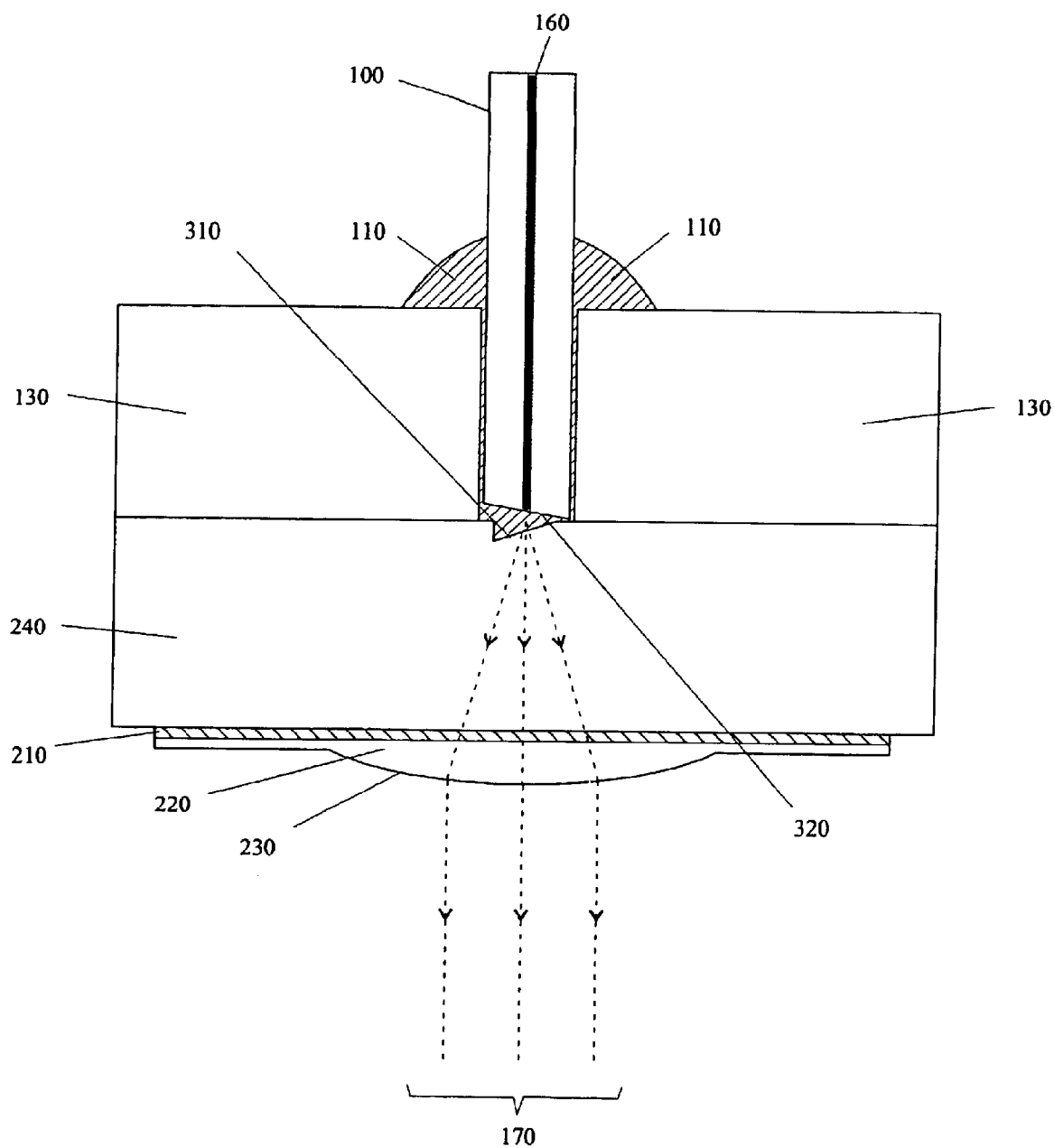
FIG. 3 is a cross sectional view of the hybrid microlens fiber coupler with tilted surfaces at the microlens focal point for substantially improved return loss performance.

In FIG. 3, an optical design for very low back-reflection is disclosed, in which the fused silica wafer 240 has a small slanted surface 310 at the focal point of the microlens 230, and the optical fiber end face 320 is angle-cleaved. The space in-between the surface 310 and the end face 320 is filled with an index-matching epoxy 110. The small reflection resulting from the small index-mismatch at the two interfaces will be directed away from the optical fiber, resulting in very low back-reflection. Our calculations have shown that the slant angle of both the surface 310 and fiber end face 320 should be between 3.5° and 8° in order to eliminate back-reflection while maximizing transmission and minimizing polarization dependent optical loss. The slanted surface 310 could be fabricated by dry etching using a gray scale photoresist mask technique as described earlier. The dimensions of the slanted surface can be 25 microns by 25 microns, for example. The slanted surface could extend either above or below the surrounding surface of the fused silica wafer.

FIGS. 4A to 4J illustrate the process for making the preferred embodiment of the hybrid microlens and the slanted surface using microfabrication.

Figure 4:
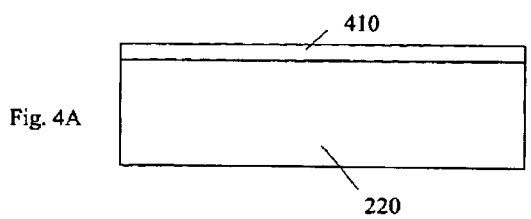
Figure 4:
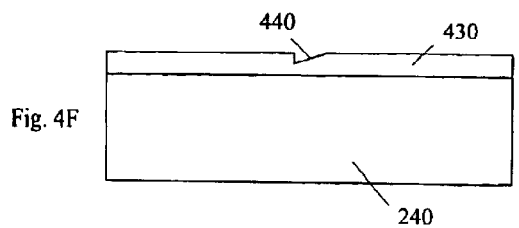
Figure 4:
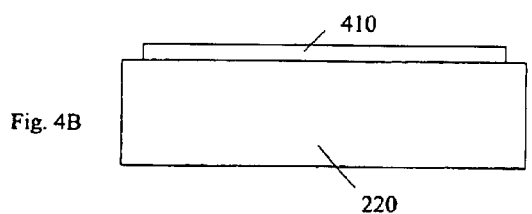
Figure 4:
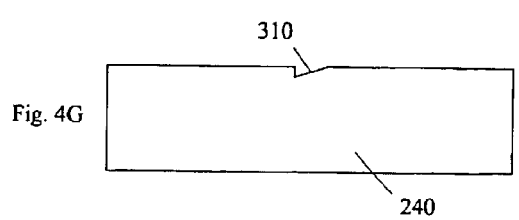
Figure 4:
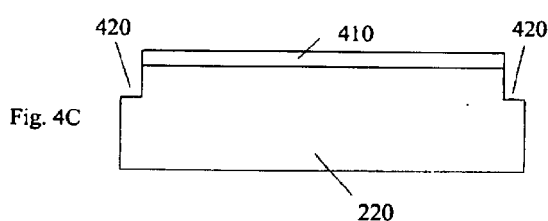
Figure 4:
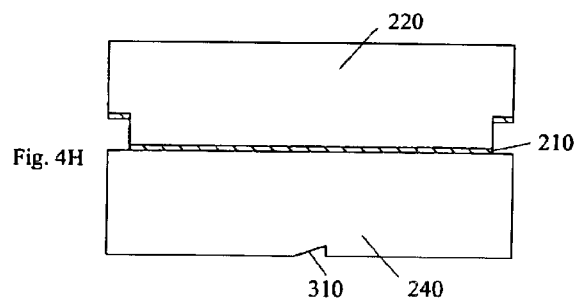
Figure 4:
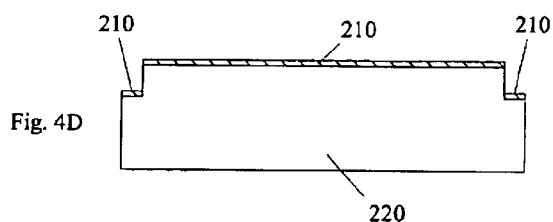
Figure 4:
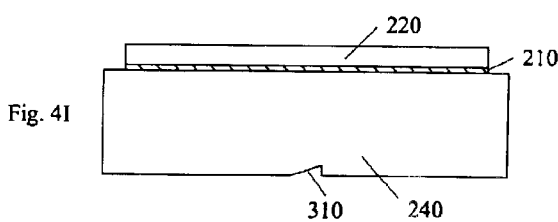
Figure 4:
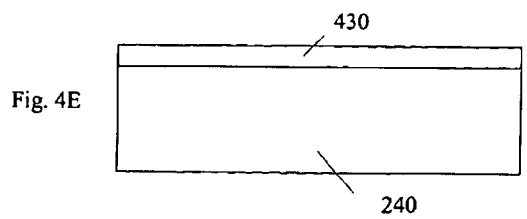
Figure 4:
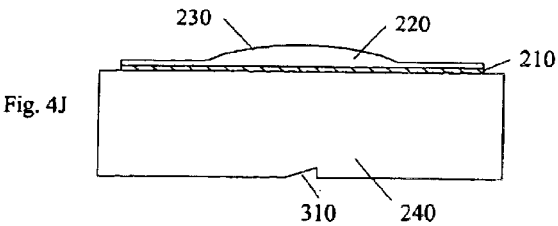

FIG. 4A shows a photoresist layer 410 spun onto the upper surface of a silicon wafer 220. Next, a precisely defined pattern is formed on the photoresist layer 410 using a photolithographic mask that defines the trenches to separate adjacent microlens regions, as shown in FIG. 4B.

Next, as shown in FIG. 4C, trenches 420 of about 50 micron deep are etched in the silicon wafer 220 using the patterned photoresist 410 as the etch mask and preferably a deep silicon etching process, which has a typical etch rate of 2 to 3 microns per minute. The trenches 420 in silicon are for stress relief, since the fused silica wafer has a different thermal expansion coefficient than the silicon wafer. The trench can also serve as an observation window during later wafer bonding processes.

After the silicon deep etching, the remaining photoresist is removed and an anti-reflection coating 210 is formed on the upper surface of the silicon wafer, as shown in FIG. 4D. The antireflection coating 210 should be optimized for a silicon-to-fused silica interface. Alternatively, the antireflection coating could be applied to the fused silica wafer 240.

FIG. 4E shows a photoresist layer 430 spun onto the upper surface of the fused silica wafer 140. The photoresist layer 430 is patterned into a slanted surface 440 as shown in FIG. 4F. The photoresist is preferably patterned using a gray scale mask process, as described earlier.

Next, the patterned photoresist 430 is used to mask the wafer 240 during dry etching. The photoresist 430 is eroded completely during etching and the retardation of the start of the fused silica etch is proportional to the photoresist thickness at that point of the wafer. As a result, the shape of the photoresist is transferred to the wafer, and the resulting slanted fused silica surface 310 is shown in FIG. 4G.

FIG. 4H shows the silicon wafer 220 properly aligned and bonded together with a fused silica wafer 240. The microlens mesa in the silicon layer 220 corresponds with the configuration of the slanted surfaces 310 in the fused silica layer 240. The very thin layer of bonding agent, which is not shown, can be an optical epoxy or polyimide, both of which have indices of refraction similar to fused silica. Alternatively, anodic bonding may be used to bond the two wafers together. FIG. 4I shows the silicon wafer 220 thinned to about 25 microns and polished. The silicon mesas are completely separated by the deep trenches.

Next, a normal refractive microlens fabrication process is used to make the microlenses 230 on the silicon layer, and the result is shown in FIG. 4J. The refractive microlens manufacturing process can be a reflow photoresist process, a gray scale photolithography process, or any other process which results in a continuously graded profile with a controllable shape.

After the hybrid microlens is made, it can be bonded to the silicon fiber socket wafer 130 in FIG. 3 using processes which are disclosed in the U.S. patent application Ser. No. 09/327826.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A hybrid microlens, comprising two layers that are transparent at a wavelength of interest, including:
    a first layer that has a low index of refraction;
    a second layer affixed to said first layer;
    said second layer having an optical focusing element formed on the surface non-adjacent to said first layer, said second layer being substantially thinner and having a higher index of refraction than the first layer, thereby reducing both the microlens sag and the sum of the two layer thicknesses and
    an antireflection layer situated between the first and second layers, said antireflection layer being optimized for the refractive indices of said first and second layers.

2. The hybrid microlens of claim 1 wherein said optical focusing element comprises a refractive microlens.

3. The hybrid microlens of claim 1 wherein said optical focusing element is formed by dry etching.

4. The hybrid microlens of claim 1 wherein said first layer comprises one of fused silica or optical glass.

5. The hybrid microlens of claim 1 wherein said second layer comprises a semiconductor.

6. The hybrid microlens of claim 1 wherein said second layer is comprised substantially of silicon.

7. The hybrid microlens of claim 1 wherein said second layer comprises a plurality of trenches that divide said second layer into a plurality of portions thereby providing reduced mechanical stress in the second layer.

8. The hybrid microlens of claim 1, wherein said first layer comprises a non-perpendicular optical surface formed on a surface non-adjacent to said second layer, said non-perpendicular optical surface approximately aligned with said optical focusing element.

9. The hybrid microlens of claim 8 wherein said non-perpendicular surface is substantially transparent to light traveling to or from the focusing element, said non-perpendicular surface being angled such that light from an optical fiber aligned with said optical focusing element that is reflected from said non-perpendicular surface is directed away from said optical fiber.

10. The hybrid microlens of claim 1 further comprising an optical fiber affixed to said first layer, said optical fiber having an end face situated proximate to said first layer, said optical fiber having a core arranged with respect to said optical focusing element to couple light between said core of said optical fiber and said optical focusing element.

11. The hybrid microlens of claim 10 wherein said first layer comprises a non-perpendicular surface formed on the first layer non-adjacent to said optical focusing element.

12. The hybrid microlens of claim 10 wherein said optical focusing element is arranged with respect to said core so that said core is approximately at a focal point defined by said optical focusing element.

13. A hybrid microlens having two layers that are transparent at a wavelength of interest, comprising:
   a first layer that has a low index of refraction;
   a second layer affixed to said first layer;
   an antireflection layer situated between the first and second layers for reducing optical loss due to the differences in the refractive indices of said first and second layers; and
   said second layer having an optical focusing element formed on the surface non-adjacent to said first layer, said second layer being substantially thinner and having a higher index of refraction than the first layer, thereby reducing both the microlens sag and the sum of the two layer thicknesses.

14. The hybrid microlens of claim 13 wherein said optical focusing element comprises a refractive microlens.

15. The hybrid microlens of claim 13 wherein said first layer comprises one of fused silica and or optical glass.

16. The hybrid microlens of claim 13 wherein said second layer comprises a semiconductor.

17. The hybrid microlens of claim 13 wherein said second layer comprises a plurality of trenches that divide said second layer into a plurality of portions thereby providing reduced mechanical stress in the second layer.

18. The hybrid microlens of claim 13 further comprising an optical fiber affixed to said first layer, said optical fiber having an end face situated proximate to said first layer, said optical fiber having a core arranged with respect to said optical focusing element to couple light between said core of said optical fiber and said optical focusing element, wherein said optical focusing element is arranged with respect to said core so that said core is approximately at a focal plane defined by said optical focusing element.

19. A hybrid microlens, having two layers that are transparent at a wavelength of interest, comprising:
   a first layer;
   a second layer affixed to said first layer;
   said second layer having an optical focusing element formed on the surface non-adjacent to said first layer, said second layer having a higher index of refraction than the first layer, and
   an antireflection layer situated between the first and second layers, said antireflection layer being optimized for the refractive indices of said first and second layers.

20. The hybrid microlens of claim 19 wherein said optical focusing element comprises a refractive microlens.

21. The hybrid microlens of claim 19 wherein said optical focusing element is formed by dry etching.

22. The hybrid microlens of claim 19 wherein said first layer comprises one of fused silica and or optical glass.

23. The hybrid microlens of claim 19 wherein said second layer comprises a semiconductor.

24. The hybrid microlens of claim 19 wherein said second layer is comprised substantially of silicon.

* * * * *